United States Patent Office 3,347,985
Patented Oct. 17, 1967

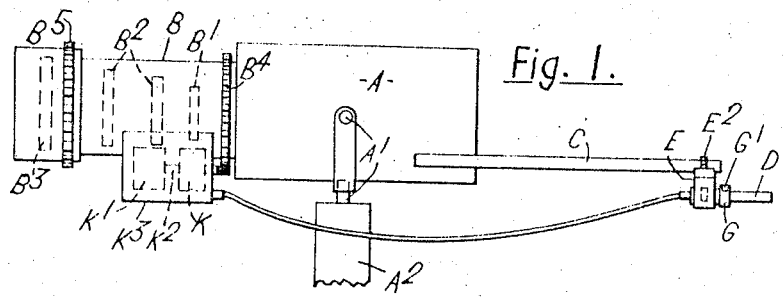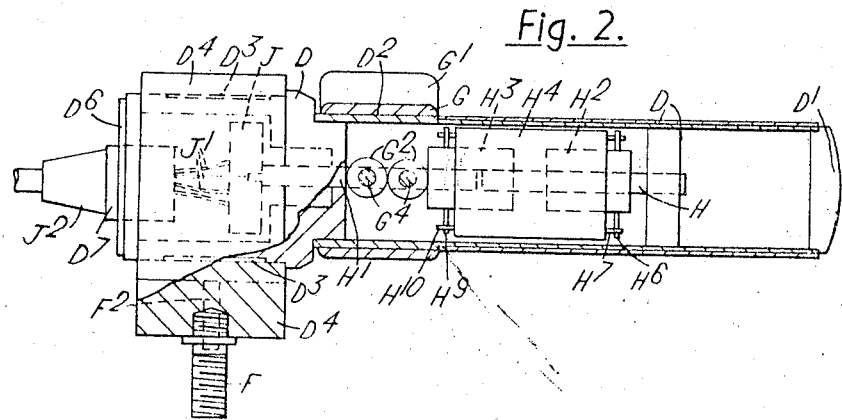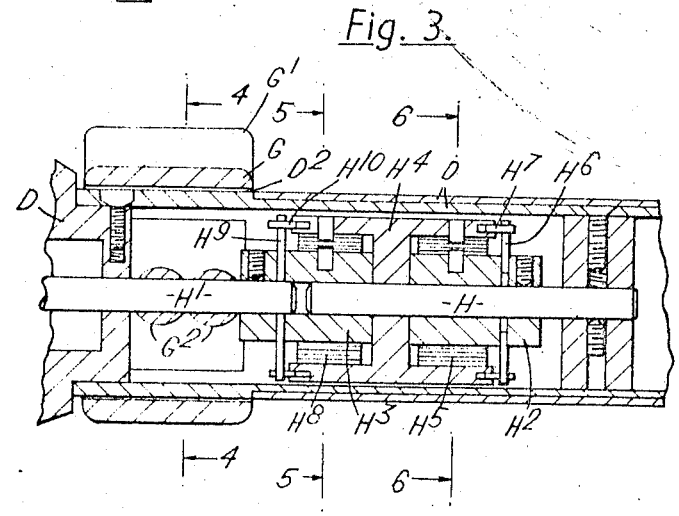

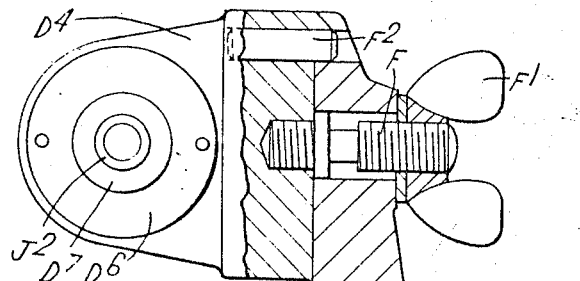
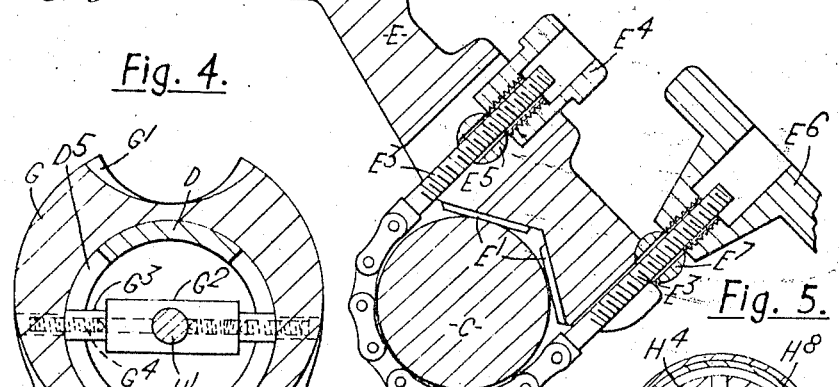
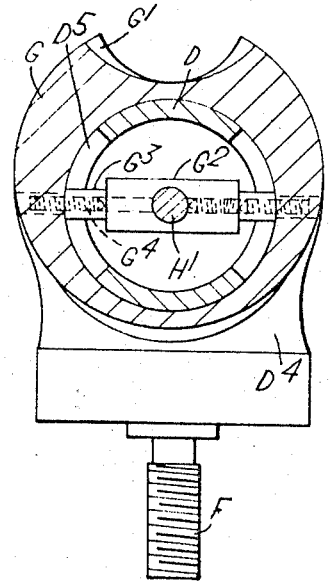
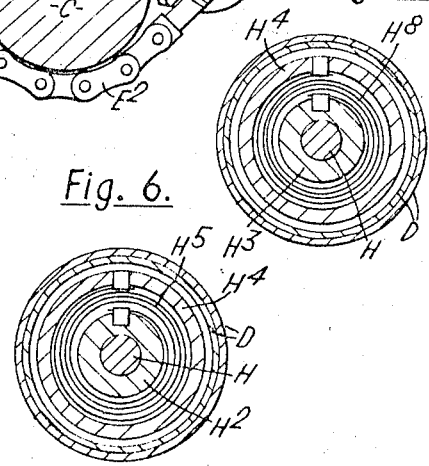
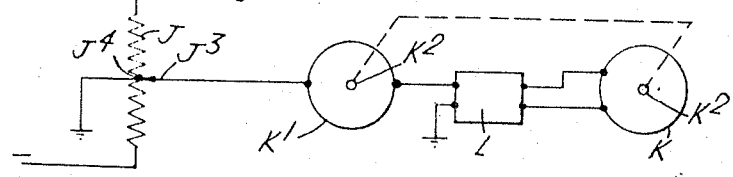

3,347,985
CONTROL MECHANISMS FOR ADJUSTING THE OBJECTIVES OF TELEVISION OR CINEMATOGRAPH CAMERAS
John D. Barr and Richard F. Clifford, Oadby, England, assignors to Rank Precision Industries Limited, trading as The Rank Organisation Rank Taylor Hobson Division, Leicester, England, a British company
Filed Mar. 23, 1964, Ser. No. 353,897
Claims priority, application Great Britain, Mar. 28, 1963, 12,342/63
10 Claims. (Cl. 178—7.92)

This invention relates to a control mechanism for a television or cinematograph camera having an adjustable objective.

Usually, for the convenience of use, a television camera is movably mounted on a pedestal or on a trolley, and is supported so that the orientation of the camera can be angularly adjusted on its mounting. Thus, by means of such mounting, the camera can be tilted or panned as may be necessary to follow a moving subject or to range over a panoramic subject. A cinematograph camera may be similarly mounted. In use, the operator is required not only to be able to control the camera for tilting and panning purposes, but also to be able to control the objective of the camera for zooming and focussing purposes. Thus, in this connection, it is to be appreciated that it is necessary to provide a television or cinematograph camera with an adjustable objective of the kind having members relatively movable under the control of a zoom control element for effecting continuous variation of the equivalent focal length of the objective throughout a range whilst maintaining constant the position of the image plane, and also having a part of the objective movable under the control of a focussing control element to suit different object distances.

The objective of the present invention is to provide a control mechanism which facilitates the task of the operator in simultaneously being able to control bodily movement of the camera and adjustment of the camera objective.

The control mechanism according to the present invention comprises a hand grip rotatable about its axis, means whereby bodily movement of the hand grip effects adjustment of the orientation of the camera, a control element carried by the hand grip to rotate therewith and being movable relatively to such hand grip under digital pressure, and means whereby relative movement between the hand grip and the control element controls the movement of a movable part of the objective of the television or cinematograph camera.

In use of this mechanism, the rotatable hand grip provides the operator with an unshifting comfortable hold during panning and tilting, the grip rotating to allow a natural posture of the arm, wrist and hand to be maintained when such hand grip is moved about. However, at the same time the operator may maintain unbroken thumb or finger engagement with the control element, since this element rotates with the hand grip. Furthermore, there is minimum risk of accidental operation of the control element, which may only properly be operated by application of digital pressure to move such element relatively to the hand grip.

Often, the camera may be provided with a handle, usually extending rearwardly, which is rigidly secured to such camera and by movement of which the orientation of the camera is adjusted on its mounting. Sometimes both left-hand and right-hand handles are provided on the camera, but often the right-hand handle is omitted or at least made of shorter length than the left-hand handle.

In a convenient arrangement, the control element is carried by a hand grip provided on the left-hand rearwardly extending handle on the camera, and acts to control zooming. This leaves the right hand of the operator free to control the focussing control element, which usually requires more sensitive adjustment. It is for the latter reason that a full-length right-hand handle is often not provided on the camera, so that the right hand of the operator is not required to contribute to any great extent towards tilting and panning control. However, when such a right-hand handle is provided on the camera, it may be convenient to provide on such handle a similar control mechanism, the control element of which acts to control focussing. Alternatively, when a right-hand handle is not provided, the hand grip may be mounted on the camera itself on the right-hand side thereof.

Preferably, the control element is spring urged relatively to the hand grip into a zero position and is movable relatively to such hand grip on either side of the zero position to control movement of the movable part of the objective respectively in opposite directions. The position of the control element preferably determines the rate of movement, respectively in opposite directions, of the part of the objective movable for zooming or focussing. Thus, with this arrangement, the positional movement of the movable part of the objective depends not only on the displacement of the control element from its zero position, but also on the time period for which the control element is maintained in the displaced position. Such a rate control system is advantageous in comparison with a position control system, especially in the case of a television camera, since it is to be realized that in this case the operator utilises a monitor screen in effecting camera adjustments, so that the provision of zooming or focussing scales is rendered unnecessary.

Conveniently, the control element may be mounted for rotational movement relative to the hand grip about an axis collinear with the axis of rotation of such hand grip.

For a television or cinematograph camera wherein a prime mover is provided for driving the movable part of the objective, the prime mover is preferably controlled by an electrical signal produced by an electrical device responsive to relative movement between the hand grip and the control element. This electrical device is preferably mounted to rotate with the hand grip, such device having a movable part mechanically linked with the control element for movement therewith relative to the hand grip to determine the magnitude of the electrical signal. For example, such electrical device may comprise a potentiometer mounted to rotate with the hand grip and having a movable contact mechanically linked with the control element. In the above-mentioned rate control system, the electrical device preferably acts to produce an electrical signal which determines the direction and speed of the output drive of the prime mover in accordance with the position of the control element relative to its zero position.

For convenience, the hand grip may be rotatably mounted on a bracket detachably secured to the camera or to a member rigidly secured thereto. When the camera is provided with a rigid handle for effecting tilting and panning, such bracket may conveniently be secured to the handle by means of a universal mounting adjustable to suit a range of handle diameters.

The invention may be carried into practice in various ways, but a preferred practical arrangement of control mechanism according thereto, for example provided on a rearwardly extending handle on the left-hand side of a television camera to permit the operator simultaneously to be able to control with the left hand only orientation of the camera for tilting and panning purposes and adjustment of the objective of the camera for zooming purposes, will now be described by way of example with reference to the accompanying drawings, in which FIGURE 1 shows the television camera somewhat diagrammatically in side elevation, with the control mechanism clamped to the rearwardly extending handle, FIGURE 2 shows the control mechanism partly in partial section and partly in side elevation, FIGURE 3 shows detail of FIGURE 2 in enlarged axial section, FIGURES 4, 5 and 6 are transverse sections respectively on the lines indicated at 4—4, 5—5 and 6—6 in FIGURE 3, FIGURE 7 shows in section the clamp for securing the control mechanism to the rearwardly extending handle, and FIGURE 8 indicates a practical arrangement of electrical transmission by means of which adjustment of the camera objective is effected from the control mechanism.

In FIGURE 1, the main body of the camera is indicated at A, supported on a universal mounting $A^1$ on top of a supporting framework $A^2$ forming part of a trolley or pedestal. On the front of the camera A is located the objective housing B, the objective consisting for example of a stationary rear member $B^1$, two intermediate members $B^2$ relatively movable for zooming purposes, and a front member $B^3$ movable for focussing purposes. Movement is imparted to the members $B^2$ of the objective through a driven element $B^4$ in one of the ways well known in the art. To the rear of the camera A on the left-hand side thereof extends a long handle C.

A hollow hand grip D, shown in more detail in FIGURE 2 and to be held by the left hand of the operator, is mounted to rotate about its axis in a bearing $D^3$ formed in a bracket $D^4$ detachably fixed to the rear end of the camera handle C so that the hand grip lies parallel to but spaced from such handle. The means for clamping the hand grip D in position is shown in detail in FIGURE 7, and comprises a relatively short arm E which at one end is secured to the bracket $D^2$ by means of a bolt F and wing nut $F^1$, in association with a locating pin $F^2$, and near the other end is formed with a wide-angled V-notch having hardened faces $E^1$ for tight bearing engagement with the camera handle C. The V-notch is forced into such tight bearing engagement with the handle C by means of a clamping chain $E^2$ passing around such handle, the chain having at each end a screw-threaded anchorage element $E^3$, and one such anchorage element being screwed into an end plug $E^4$ abutting against a cross-pin $E^5$ at an intermediate point in the length of the arm $E^1$ adjacent to one side of the V-notch whilst the other anchorage element cooperates with a tightening nut $E^6$ which acts against a second cross-pin $E^7$ at the end of the arm adjacent to the other side of the V-notch. The clamping chain $E^2$, when tightened up, firmly fixes the arm E, and thus the bracket $D^2$, against relative movement relative to the handle C, whilst at the same time being adjustable to suit a range of handle diameters and permitting the hand grip D to be located at any desired angular position around the handle C, in generally parallel relationship with such handle at a distance therefrom determined by the length of the relatively short arm E.

Although not shown, end stops may be provided if desired to limit the rotational movement of the hand grip D in its bearing $D^1$, and also a friction spring may be provided at such bearing so as somewhat to stiffen such rotational movement of the hand grip.

On the rotatable grip D, approximately a hand's width in front of the rear end $D^1$ thereof, is mounted a zoom control element in the form of a ring G surrounding such hand grip at a bearing surface $D^2$ thereon, and provided with a semi-circular groove $G^1$ for engagement by the thumb. By means later described, the zoom control ring G is rotationally spring urged relatively to the hand grip D into a zero position, displacement from which in either direction, by application of thumb pressure, causes adjustment of the camera objective for zooming purposes. During rotation of the hand grip D, the zoom control ring G rotates therewith either in its zero position or in such displaced position therefrom in which it is maintained by digital pressure, and zoom adjustment may be effected only by rotational movement of the control ring G relative to such hand grip D. Thus, with this arrangement, the operator is provided with an unshifting comfortable hold during panning and tilting of the camera A, the hand grip D rotating to allow a natural posture of the arm, wrist and hand to be maintained as the orientation of the camera is adjusted. At the same time, the operator may maintain unbroken thumb control of the zoom control ring G, since this ring rotates with the hand grip D. No rotation of the control ring G relative to the hand grip D occurs unless a change in thumb pressure is applied. There is therefore substantially no risk of accidental operation of the control ring G to effect undesired zoom adjustment. In the central position of the camera A, in which the camera handle C will extend substantially horizontally and directly rearwardly as instanced in FIGURE 1, the zoom control ring G preferably has a zero position in which the thumb groove $G^1$ is uppermost. Thus, when for example the camera A is titled downwardly, so that the camera handle C is raised, the hand grip D will tend to rotate, in a clockwise sense as viewed from the rear, so that the zero position of the control ring G is moved through up to say 120 degrees.

The means by which the control ring G is spring urged into its zero position is clearly shown in FIGURES 3 to 6, and constitutes an arrangement such that a substantial pressure is exerted on such control ring even at positions of small displacement thereof from the zero position. In such arrangement, two coaxial relatively rotatable spindles H and $H^1$ are located on the axis of the hand grip D, the rear spindle H being fixed against rotation relatively to such hand grip and the front spindle $H^1$ being fixed against rotation relatively to the control ring G. For the latter purpose, the front spindle $H^1$ is fixed to a pair of cross-pins $G^2$ with reduced end portions $G^3$ internally screwthreaded to receive fixing screws $G^4$ projecting radially inwards from the control ring G through arcuate slots $D^5$ in the hand grip D at the portion thereof providing the bearing $D^2$ for such control ring. The rear spindle H is keyed to a surrounding sleeve $H^2$ and the front spindle $H^1$ is keyed to a surrounding sleeve $H^3$, both such sleeves being largely accommodated within a barrel $H^4$ and such barrel and each such sleeve being relatively rotatable. Between the barrel $H^4$ and the rear sleeve $H^2$ is housed a clock-type spring $H^5$ which acts to urge the barrel rotationally about the sleeve in one sense (clockwise as viewed from the rear in FIGURE 3) as far as permitted by stops constituted by radial pins $H^6$ carried by the sleeve $H^2$ and longitudinal pins $H^7$ carried by the barrel $H^4$, and between the barrel $H^4$ and the front sleeve $H^3$ is housed a clock-type spring $H^8$ which acts to urge the sleeve rotationally within the barrel in the opposite sense (anti-clockwise as viewed from the rear in FIGURE 3) as far as permitted by stops constituted by radial pins $H^9$ carried by the sleeve $H^3$ and longitudinal pins $H^{10}$ carried by the barrel $H^4$. Thus, the zero position of the control ring G, which is keyed to the front sleeve $H^3$ through the front spindle $H^1$, is determined by the position in which rotation of the sleeve $H^3$ in one sense is limited by the stops $H^9$ and $H^{10}$, the position of the stop pins $H^{10}$ being determined by the position in which rotation of the barrel $H^4$ in the opposite sense is limited by the stops $H^6$ and $H^7$, the stop pins $H^6$ being fixed to the rear sleeve $H^2$ which is keyed to the hand grip D through the rear spindle H. With this arrangement, rotation of the control ring G in one direction away from the zero position is permitted by rotation of the front sleeve $H^3$ within the barrel $H^4$ away from the stop pins $H^{10}$, whilst rotation of such control ring in the other direction away from the zero position is permitted by rotation of the front sleeve $H^3$ and barrel $H^4$ together relative to the rear sleeve $H^2$ away from the stop pins $H^6$. In whichever sense the control ring G is displaced, there is a substantial spring force acting to urge such control ring back to the zero position. The arcuate slots $D^5$ in the portion of the hand grip D affording the bearing $D^2$ for the control ring G act to limit the displacement of such control ring, in either direction, from its zero position.

The zoom control ring G preferably acts to control zoom adjustment by means of a rate control system. With such a system, the displacement of the control ring G from its zero position acts to determine the rate of zoom, so that the positional movement of the members $B^2$ of the objective movable for zooming depends not only on the displacement of the control ring but also on the time period for which such control ring is held in the displaced position. Thus when, as is usual, a reversible electric motor is employed to drive the members $B^2$ of the objective movable for zooming, the zoom control ring G acts to control an electrical device, for example a potentiometer having an earthed central point providing an electrical signal which determines the speed of the output drive of the electric motor. Displacement of the control ring G in opposite directions from its zero position determines the polarity of the electric signal and thus the direction of drive of the electric motor. With this system, zooming in a given direction continues as long as the control ring is maintained in its displaced position, but stops substantially at once when digital pressure is released to allow such control ring G to return to its zero position. There is substantially no time lag in stopping of zoom when the control ring is released, which is advantageous, by comparison with most position control systems, when the operator is working from a monitor screen.

In the above-described control mechanism, a potentiometer J for providing the required electrical signal is housed within the hollow hand grip D to rotate therewith near the front end of such hand grip, and has a movable contact (not shown in FIGURE 2) which is mechanically linked with the zoom control ring G. For this purpose, the front axial spindle $H^1$, which is keyed to the control ring G at the cross-pins $G^2$, is extended forwardly to be keyed at its front end to the movable contact of the potentiometer J from which the required electrical signal is taken. Flexible electric wires $J^1$ from the potentiometer J are taken to the front of the hand grip D and led out through an end plate $D^6$ within a sheath $J^2$ accommodated by a rotatable bushing $D^7$.

A convenient practical electrical transmission, from the potentiometer J to the driven element $B^4$ for driving the movable members $B^2$ of the objective, is shown by way of example in FIGURE 8. The movable contact of the potentiometer is indicated at $J^3$, and its earthed central point at $J^4$. In the zero position of the control ring G, the movable contact $J^3$ lies at this central point $J^4$ of the potentiometer, so that the electrical output is zero. The potentiometer J acts to control a servo-device constituted by a reversible electric motor K and a tacho-generator $K^1$. As shown in FIGURE 1, these parts have a common shaft $K^2$, which constitutes an output shaft as regards the motor K and an input shaft as regards the tacho-generator $K^1$, and is utilized to drive the driven element $B^4$ to effect zooming. The parts K and $K^1$ are contained in a small casing $K^3$ mounted on the side of the objective housing B.

In the arrangement of FIGURE 8, the output of the potentiometer J is fed to an amplifier L, to which is also fed, in opposition to the potentiometer voltage, the output voltage of the tacho-generator $K^1$. The amplified difference of these two voltages is applied to the motor to control the speed thereof. Since the output voltage of the tacho-generator $K^1$ is dependent on the speed of its input shaft $K^2$, which also constitutes the output shaft of the motor K, the voltage applied to the motor constitutes a correcting voltage for adjusting the speed of the motor to try to eliminate any difference between such speed and that demanded by the position of the control ring G. The arrangement thus constitutes a speed controlling servo-device wherein, when the control ring G is released to return to its zero position under spring pressure, the potentiometer contact $J^3$ returns to the earthed point $J^4$ of such potentiometer J, and a large reversing voltage is applied to the motor K to stop such motor substantially immediately. In the actual circuit arrangement shown, the output voltage of the potentiometer J and the output voltage of the tacho-generator $K^1$ are combined at the tacho-generator, the output voltage of the potentiometer being taken through such tacho-generator to the amplifier L.

The above-described control mechanism enables the operator of the television camera to be able to effect tilt and pan control and also zoom control by means of the left hand only, thus leaving the right hand free for focus adjustment, which usually requires more critical adjustment. It will be appreciated however, that on a television camera provided with a right-hand rearwardly extending handle as well as a left-hand handle, a similar control mechanism may be provided on such right-hand handle for focus control, an electrical transmission, conveniently again being constituted by a speed controlling servo-device, being utilised to drive an element $B^5$ for driving the member $B^3$ of the objective movable for focussing. Alternatively, a generally similar control mechanism for focus control may be mounted directly on the camera on the right-hand side thereof, when no right-hand rearwardly extending handle is provided.

It will also be appreciated that the above-described arrangement may be modified in various ways within the scope of the invention. For example, the mechanism may be provided for use with a position control system, electrical transmission means being provided in this instance to cause the movable part of the objective positionally to follow displacement of the control element. Such electrical transmission means may or may not include an electrical device which is carried by the hand grip and controlled by the control element, since such electrical device may alternatively be operated by the control element through a Bowden wire. It will also be clear that the control element may be alternatively mounted for pivotal lever movement or sliding axial movement relative to the hand grip. Finally, it is to be appreciated that the hand grip may be mounted coaxially with the camera handle if desired, being in the form of a sleeve surrounding such handle at the rear end thereof, or alternatively may be mounted at a convenient angle to such handle or yet again may be mounted in a variety of ways other than on such a handle so that bodily movement of such hand grip effects adjustment of the orientation of the camera.

What we claim as our invention and desire to secure by Letters Patent is:

1. A control mechanism for a camera which has an adjustable objective and is movably mounted so that the orientation of such camera can be angularly adjusted on its mounting, said control mechanism comprising a hand grip rotatable about its axis, means whereby bodily movement of the hand grip effects adjustment of the orientation of the camera, a control element carried by the hand grip to rotate therewith and being movable relatively to such hand grip under digital pressure, and transmission means whereby relative movement between the hand grip and the control element controls the movement of a movable part of the objective of the camera.

2. A control mechanism as claimed in claim 1 including spring means urging the control element into a zero position which corresponds to a stationary condition of the movable part of the objective of the camera relatively to the hand grip, said control element being movable relatively to such hand grip on either side of the zero position to control movement of the movable part of the objective respectively in opposite directions.

3. A control mechanism as claimed in claim 2 for a camera wherein a prime mover is provided for driving the movable part of the objective, in which the said transmission means includes an electrical device responsive to relative movement between the hand grip and the control element to produce electrical signal for controlling the prime mover.

4. A control mechanism as claimed in claim 3 in which the electrical device controlling the prime mover comprising a potentiometer having a resistance element and a contact element in wiping engagement with said resistance element, one such element being mounted to rotate with the hand grip, and the other element being mechanically linked with the control element for movement therewith relative to the hand grip to determine the magnitude of the electrical signal.

5. A control mechanism as claimed in claim 1 in which relative movement between the hand grip and the control element controls movement of a part of the objective movable for zooming.

6. A control mechanism as claimed in claim 1 in which the control element is mounted for rotational movement relative to the hand grip about an axis collinear with the axis of rotation of such hand grip.

7. A camera having an adjustable mounting on which the orientation of the camera can be angularly adjusted, an optical objective on such camera, such objective having parts relatively movable for adjustment purposes, and a control mechanism comprising a hand grip rotatable about its axis, connecting means whereby bodily movement of the hand grip effects adjustment of the orientation of the camera, a control element carried by the hand grip to rotate therewith and being movable relatively to such hand grip under digital pressure, and transmission means whereby relative movement between the hand grip and the control element controls the movement of a movable part of the objective of the camera.

8. A camera as claimed in claim 7 in which the connecting means comprises a handle rigidly secured to the camera and by movement of which the orientation of the camera is adjusted on its mounting, the camera also including securing means for fastening the hand grip to such handle.

9. A camera as claimed in claim 8 in which the securing means comprises a bracket on which the hand grip is rotatably mounted, and mounting means adjustable to suit a range of handle diameters securing said bracket to the handle of the camera.

10. A camera as claimed in claim 7 including spring means urging the control element relatively to the hand grip into a zero position which corresponds to a stationary condition of the movable part of the objective of the camera said control element being movable relatively to such hand grip on either side of the zero position to control movement of the movable part of the objective respectively in opposite directions, and said transmission means being such that the position of the control element relative to its zero position determines the rate of movement, respectively in opposite directions, of the part of the objective movable for adjustment purposes.

References Cited
UNITED STATES PATENTS

| | | | |
|---|---|---|---|
| 2,830,514 | 4/1958 | Brooks | 352—243 |
| 3,187,658 | 6/1965 | Debrie | 95—86 |
| 3,282,231 | 11/1966 | Askew | 318—30 |

FOREIGN PATENTS 500,873   6/1930   Germany.

JOHN W. CALDWELL, Acting Primary Examiner.

DAVID G. REDINBAUGH, Examiner.

P. SPERBER, J. A. ORSINO, Assistant Examiners.